(12) United States Patent
Kawakami

(10) Patent No.: US 10,541,411 B2
(45) Date of Patent: Jan. 21, 2020

(54) NEGATIVE ELECTRODE MATERIAL FOR POWER STORAGE DEVICE, ELECTRODE STRUCTURE, POWER STORAGE DEVICE, AND PRODUCTION METHOD FOR EACH

(71) Applicant: Soichiro Kawakami, Machida (JP)

(72) Inventor: Soichiro Kawakami, Machida (JP)

( * ) Notice: Subject to any disclaimer, the term of this patent is extended or adjusted under 35 U.S.C. 154(b) by 290 days.

(21) Appl. No.: 15/326,281

(22) PCT Filed: Jul. 15, 2015

(86) PCT No.: PCT/JP2015/070212
§ 371 (c)(1),
(2) Date: Jan. 13, 2017

(87) PCT Pub. No.: WO2016/010056
PCT Pub. Date: Jan. 21, 2016

(65) Prior Publication Data
US 2017/0200943 A1     Jul. 13, 2017

(30) Foreign Application Priority Data
Jul. 15, 2014  (JP) ................................ 2014-144814

(51) Int. Cl.
*H01M 4/134* (2010.01)
*H01M 4/04* (2006.01)
(Continued)

(52) U.S. Cl.
CPC ............ *H01M 4/366* (2013.01); *H01G 11/38* (2013.01); *H01G 11/40* (2013.01); *H01G 11/46* (2013.01);
(Continued)

(58) Field of Classification Search
None
See application file for complete search history.

(56) References Cited

U.S. PATENT DOCUMENTS

2002/0076613 A1*  6/2002  Lee ..................... H01M 4/0402
                                              429/231.1
2006/0147797 A1   7/2006  Wu et al.
(Continued)

FOREIGN PATENT DOCUMENTS

JP    2006-019309 A    1/2006
JP    2006-190642 A    7/2006
(Continued)

OTHER PUBLICATIONS

Hui Wu et al., "Stable cycling of double-walled silicon nanotube battery anodes through solid-electrolyte interphase control", nature nanotechnology (2012), vol. 7: p. 310-315.
(Continued)

*Primary Examiner* — Maria Laios
(74) *Attorney, Agent, or Firm* — Hamre, Schumann, Mueller & Larson, P.C.

(57) ABSTRACT

Provided is an anode active material for energy storage devices capable of electrochemically inserting and extracting lithium ions and production method thereof, an electrode structure including the active material and flake graphite, and an energy storage device using the electrode structure as an anode. The anode active material includes secondary particles that are aggregates of 10-300 nm primary particles containing silicon as a main component. The primary particles each include, as a surface layer, a composite metal oxide layer containing at least one or more metal elements selected from at least Al, Zr, Mg, Ca, and La and Li.

1 Claim, 7 Drawing Sheets

(51) Int. Cl.

| | | |
|---|---|---|
| *H01M 4/36* | (2006.01) | |
| *H01G 11/50* | (2013.01) | |
| *H01G 11/70* | (2013.01) | |
| *H01G 11/86* | (2013.01) | |
| *H01M 10/0567* | (2010.01) | |
| *H01G 11/64* | (2013.01) | |
| *H01G 11/38* | (2013.01) | |
| *H01G 11/40* | (2013.01) | |
| *H01G 11/46* | (2013.01) | |
| *H01G 11/60* | (2013.01) | |
| *H01G 11/62* | (2013.01) | |
| *H01M 4/38* | (2006.01) | |
| *H01M 4/485* | (2010.01) | |
| *H01M 4/62* | (2006.01) | |
| *H01M 10/0525* | (2010.01) | |
| *H01M 10/0568* | (2010.01) | |
| *H01M 10/0569* | (2010.01) | |
| *H01M 4/02* | (2006.01) | |

(52) U.S. Cl.
CPC ............ *H01G 11/50* (2013.01); *H01G 11/60* (2013.01); *H01G 11/62* (2013.01); *H01G 11/64* (2013.01); *H01G 11/70* (2013.01); *H01G 11/86* (2013.01); *H01M 4/0471* (2013.01); *H01M 4/134* (2013.01); *H01M 4/386* (2013.01); *H01M 4/485* (2013.01); *H01M 4/622* (2013.01); *H01M 4/625* (2013.01); *H01M 10/0525* (2013.01); *H01M 10/0567* (2013.01); *H01M 10/0568* (2013.01); *H01M 10/0569* (2013.01); *H01M 2004/021* (2013.01); *H01M 2004/027* (2013.01); *H01M 2300/0037* (2013.01)

(56) References Cited

U.S. PATENT DOCUMENTS

| | | | |
|---|---|---|---|
| 2008/0003503 A1* | 1/2008 | Kawakami | H01G 9/155 429/231.5 |
| 2011/0097627 A1 | 4/2011 | Watanabe et al. | |
| 2011/0159372 A1 | 6/2011 | Zhamu et al. | |
| 2012/0321949 A1* | 12/2012 | Kawakami | H01G 11/46 429/211 |
| 2013/0273423 A1* | 10/2013 | Jeong | H01M 4/622 429/217 |
| 2014/0004420 A1* | 1/2014 | Hatanaka | H01M 4/131 429/211 |
| 2014/0087266 A1* | 3/2014 | Li | H01M 4/485 429/231.3 |

FOREIGN PATENT DOCUMENTS

| | | |
|---|---|---|
| JP | 2008-016446 A | 1/2008 |
| JP | 2010-262843 A | 11/2010 |
| JP | 2011-096455 A | 5/2011 |
| JP | 2013-073818 A | 4/2013 |
| JP | 2013-516037 A | 5/2013 |
| JP | 2013-219018 A | 10/2013 |
| WO | 2011/093015 A1 | 8/2011 |

OTHER PUBLICATIONS

Nguyen et al., "Alumina-coated silicon-based nanowire arrays for high quality Li-ion battery anodes", Journal of Material Chemistry (2012), vol. 22: p. 24618-24626.

Luo et al., "Crumpled Graphene-Encapsulated Si Nanoparticles for Lithium Ion Battery Anodes", The Journal of Physical Chemistry Letters (2012), vol. 3: p. 1824-1829.

Ma et al., "Exfoliated graphite as a flexible and conductive support for Si-based Li-ion battery anodes", Carbon (2014), vol. 72: p. 38-46.

Bridel et al., "Key Parameters Governing the Reversibility of Si/Carbon/CMC Electrodes for Li-Ion Batteries", Chemistry of Materials (2010), vol. 22: p. 1229-1241.

Kovalenko et al., "A Major Constituent of Brown Algae for Use in High-Capacity Li-Ion Batteries", Science (2011), vol. 334: p. 75-79.

Magasinski et al., "Toward Efficient Binders for Li-Ion Battery Si-Based Anodes: Polyacrylic Acid", ACS Applied Materials & Interfaces (2010), vol. 2: p. 3004-3010.

Yu et al., "Silicon Thin Films as Anodes for High-Performance Lithium-Ion Batteries with Effective Stress Relaxation", Advanced Energy Materials (2012), vol. 2: p. 68-73.

Chen et al., "Effect of vinylene carbonate (VC) as electrolyte additive on electrochemical performance of Si film anode for lithium ion batteries", Journal of Power Sources (2007), vol. 174: p. 538-543.

Lin et al., "High performance silicon nanoparticle anode in fluoroethylene carbonate-based electrolyte for Li-ion batteries", Chemical Communications (2012), vol. 48: p. 7268-7270 (abstract only).

Cui et al., "Inorganic Glue Enabling High Performance of Silicon Particles as Lithium Ion Battery Anode", Journal of The Electrochemical Society (2011); vol. 158: p. A592-A596.

International Search Report, dated Nov. 10, 2015, International Patent Application No. PCT/JP2015/070212 with English translation (7 pages).

* cited by examiner

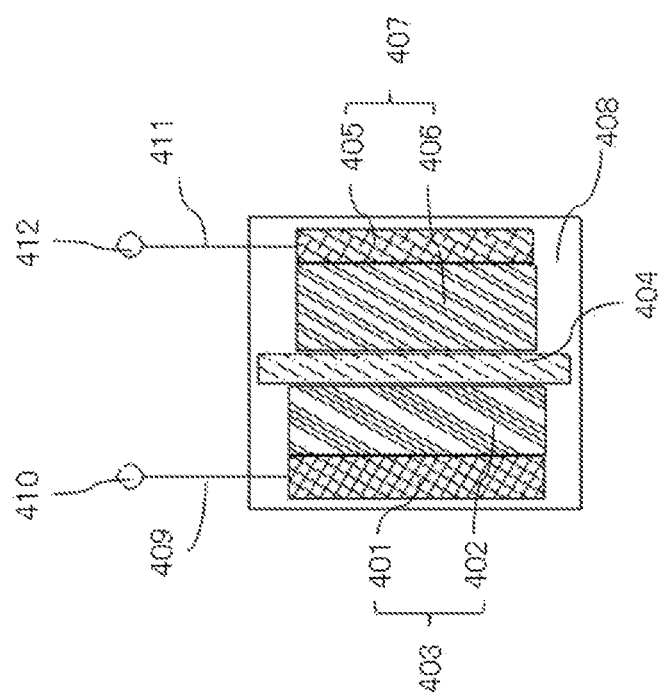

NEGATIVE ELECTRODE MATERIAL FOR POWER STORAGE DEVICE, ELECTRODE STRUCTURE, POWER STORAGE DEVICE, AND PRODUCTION METHOD FOR EACH

TECHNICAL FIELD

The present invention relates to a method for producing an anode material that contains silicon, which forms an alloy with lithium in an electrochemical reaction, as a main component and can store and release lithium ions, a method for producing an electrode structure formed of the material, and a method for producing an energy storage device including the electrode structure.

BACKGROUND ART

The possibility that the green house effect due mainly to increases in the amount of $CO_2$ in the atmosphere may be changing the climate of the earth has been pointed out in recent years. It has been also pointed out that the air pollutants, including $CO_2$, $NO_x$, and hydrocarbons, discharged from automobiles being used as moving means affect health. In terms of the protection against increases in the prices of energy resources such as oil, the preservation of the environment, or the protection against disasters, high expectations have been recently placed on hybrid vehicles, which are each a combination of an electric motor driven by electricity stored in a storage device and an engine and which are energy-efficient, electric vehicles, smart grids, which are systems for managing energy from energy plants through a network and optimizing the demand/supply balance of energy, and energy storage systems. In the field of information communication, information terminals such as smartphones are rapidly penetrating the society, since they easily receive and transmit information. Under these circumstances, energy storage devices, such as capacitors or rechargeable batteries, are required to have high output density, high energy density, and long life to improve the performance of smartphones, hybrid vehicles, electric vehicles, smart grids, and the like, as well as to reduce production cost.

Among the commercialized energy storage devices, lithium-ion rechargeable batteries (commonly called "lithium-ion batteries"), which each use carbon, such as graphite, as an anode and a compound of lithium and transition metals as a cathode, have the highest energy density. However, a lithium-ion rechargeable battery, whose anode is formed of a carbon material, can theoretically intercalate only a number of lithium atoms corresponding to up to ⅙ the number of carbon atoms. For this reason, it is difficult to further increase the capacity, and increasing the capacity requires a new electrode material. Lithium-ion rechargeable batteries are expected to become power supplies for hybrid vehicles or electric vehicles thanks to their high energy density. On the other hand, lithium-ion rechargeable batteries have a problem that when quickly discharged, they cannot discharge a sufficient amount of electricity due to their large internal resistance, that is, their output density is low. For this reason, there is a demand to develop high-output-density, high-energy-density energy storage devices. To satisfy this demand, tin, silicon, and alloys thereof, which can store and release more lithium ions than graphite, are being studied. Tin and silicon can electrochemically store more lithium ions. However, these elements expand their volumes by a factor of as many as about four and repeatedly expand and contract through charges and discharges, resulting in increases in the electrode resistance and reductions in the electrode performance. To prevent reductions in the electrode performance, there have been made various proposals about silicon particles themselves, conductive additives, binders, and current collector substrates.

Non-Patent Literature 1 proposes, as an electrode having long charge-discharge cycle life, a silicon nanotube that contains expansion space and whose outermost surface is coated with silicon oxide. Non-Patent Literature 2 proposes a silicon nanowire which is coated with alumina by atomic layer deposition, as an electrode active material having long cycle life. However, the silicon nanotube needs to be produced through many steps and therefore is not suitable for mass production, nor is the silicon nanowire suitable for mass production. Accordingly, any of the silicon nanotube and silicon nanowire is difficult to provide cheaply. Nor is the coating with alumina suitable for mass production.

To suppress the crack of particles during lithiation (lithium insertion), attempts are being made to produce an anode for rechargeable batteries that includes submicron or less sized silicon particles (commonly called "silicon nanoparticles"), which are easily mass-produced unlike the silicon nanotube and silicon wire. However, even such silicon particles have low electron conductivity and expand during lithiation as well. For this reason, Non-Patent Literature 3 and the like propose forming a composite with graphene to improve electron conductivity and to ensure expansion space. However, a method for producing graphene used to improve conductivity described in Non-Patent Literature 3 is not suitable for mass production. On the other hand, Patent Literature 1 proposes a composite of a battery active material capable of forming an alloy with lithium, such as silicon, and expanded graphite or flake graphite. However, any of expanded graphite and flake graphite has a large particle size and therefore it is difficult to mix and disperse and submicron or less-sized silicon particles uniformly. Non-Patent Literature 4 proposes forming a composite of a graphite nanosheet and silicon particles by immersing expanded graphite in a tetrahydrofuran solution of silicon nanoparticles and polyvinyl chloride and applying ultrasound to the expanded graphite to flake off the expanded graphite. However, a flake-off device using ultrasound is difficult to be scaled up and therefore is not suitable for mass production. For this reason, there is a demand to develop a method for producing an easy-to-mass-produce, cheap conductive additive that is suitable for fine silicon particles.

Patent Literature 2 proposes metal coating for improving the electron conductivity of silicon particles and ceramic coating for suppressing the pulverization of silicon particles caused by expansion during lithiation. Patent Literature 3 proposes means of extending the charge-discharge cycle life by providing silicon particles with a metal oxide coating layer formed of a raw material, such as alkoxide, by sol-gel reaction. Patent Literature 4 proposes silicon nanoparticles coated with a metal oxide coating and dispersed in silicon oxide in order to suppress gas generated by the decomposition of an organic solvent in an electrolyte solution. In any of the proposals, the coating of silicon particles does not reduce the amount of silicon oxide that causes an irreversible lithiation-delithiation capacity during charge-discharge but rather often increases the amount, resulting in a reduction in the initial charge-discharge coulombic efficiency.

To form the anode of a lithium-ion battery using silicon particles as an active material, it is important that the binder be formed of a material capable of enduring the expansion and contraction of the volume during lithium storing/releasing. As the material of the binder, Non-Patent Literature 5 proposes carboxymethylcellulose; Non-Patent Literature 6 proposes sodium alginate; and Non-Patent Literature 7 proposes polyacrylic acid. However, these materials have a problem that any of the polymers thereof does not provide sufficient strength when used in a small amount and reduces the conductivity of the electrode when used in an amount to maintain strength. For this reason, there is a demand to develop a technique that can increase the mechanical strength of the electrode even when a small amount of binder is used.

An electrode in which an electrode layer including silicon particles are formed on a current collector formed of a metal foil expands or contracts due to the storing or releasing of lithium. The current collector receives stress accordingly. Since the electrode layer is not completely uniform, the metal foil as a current collector becomes crinkled ununiformly, thereby flaking off the electrode layer. This increases the electrical resistance of the electrode and reduces the charge-discharge cycle life. For this reason, there is a demand for a current collector or electrode structure that does not become crinkled ununiformly. Non-Patent Literature 8 discloses that stress caused by the lithiation is released by using a flexible current collector formed by evaporating a metal thin-film onto a flexible substrate. However, the metal thin-film disadvantageously cannot cope with the charge or discharge of large current. In order to suppress the distortion or breakage of the anode current collector and thus the deformation of the anode, Patent Literature 5 proposes an electrode including a current collector having thereon multiple protrusions and an alloy-based active material disposed on the protrusions. However, this electrode has a problem that a step of eliminating the distortion of the current collector is required and a problem that the lamination of the active material only on the protrusions increases the number of production steps, as well as the production cost.

To improve the cycle life of an electrode using silicon particles as an active material, Non-Patent Literature 9 proposes an electrolyte solution containing vinylene carbonate as an additive; Non-Patent Literature 10 proposes an electrolyte solution containing fluoroethylene carbonate as an additive. These electrolyte solutions extend the life compared to those not containing these additives. However, the thickness of a solid electrolyte interphase (SEI) layer generated by the decomposition of the electrolyte solution is moderately increased, and the conductivity of the electrode is reduced. That is, the growth of an SEI layer is not sufficiently suppressed. For this reason, there is a demand for an additive which is effective in suppressing the growth of an SEI layer.

CITATION LIST

Patent Literature

[Patent Literature 1] Japanese Unexamined Patent Application Publication No. 2013-219018
[Patent Literature 2] Japanese Unexamined Patent Application Publication No. 2006-19309
[Patent Literature 3] Japanese Unexamined Patent Application Publication No. 2006-190642
[Patent Literature 4] Japanese Unexamined Patent Application Publication No. 2011-96455
[Patent Literature 5] WO2011/093015

Non-Patent Literature

[Non-Patent Literature 1] Nature Nanotechnology, 7, 310-315 (2012).
[Non-Patent Literature 2] The Journal of Materials Chemistry, 22, 24618-24626 (2012).
[Non-Patent Literature 3] The Journal of Physical Chemistry Letters, 3 (13), 1824-1829 (2012).
[Non-Patent Literature 4] Carbon, 72, 38-46 (2014).
[Non-Patent Literature 5] Chemistry of Materials, 22 (3), 1229-1241 (2010).
[Non-Patent Literature 6] Science, 334, 75-79 (2011).
[Non-Patent Literature 7] ACS Applied Materials & Interfaces, 2 (11), 3004-3010 (2010).
[Non-Patent Literature 8] Advanced Energy Materials, 2, 68-73 (2012).
[Non-Patent Literature 9] Journal of Power Sources, 174, 538-543 (2007).
[Non-Patent Literature 10] Chemical Communications, 48, 7268-7270 (2012).

SUMMARY OF INVENTION

Technical Problem

In view of the foregoing, an object of the present invention is to provide an anode active material (anode material) that can electrochemically store and release a large amount of lithium ions and that is formed of a material having a high ratio of the initial lithium-ion release amount to the initial lithium-ion storage amount and containing silicon as a main component, and production method thereof.

Another object of the present invention is to provide a long-life electrode structure formed of an active material that is prepared using the above production method and can electrochemically store and release a large amount of lithium ions and a high-output-density, high-energy-density energy storage device that includes the electrode structure and whose capacity decreases to a lesser extent even if the energy storage device is repeatedly charged and discharged.

The expression "energy storage device" includes capacitors, rechargeable batteries, a combination of a capacitor and a rechargeable battery, and those devices having a power generation function.

Solution to Problem

The present inventor found the following: to maintain high capacity and achieve high charge-discharge efficiency and long charge-discharge cycle life in an energy storage device, such as a lithium-ion rechargeable battery, using an anode including particles containing silicon as a main component (hereafter referred to as silicon anode), all the components of the silicon anode, that is, the particles themselves containing silicon as a main component, a conductive additive, a binder and pores that absorb the expansion of the volume during lithiation (lithium insertion), a current collector capable of enduring stress that occurs when the volume is expanded, and an electrolyte solution additive for forming a stable SEI layer are important; and it is necessary to consider a comprehensive measure such that the performance of the silicon anode can be delivered. Further, the present inventor found the following (1) to (5) and then found that a silicon anode (silicon electrode) and lithium-ion rechargeable battery each having high capacity and long-life could be realized.

(1) The inventor found that by providing a lithium composite oxide layer containing metal elements selected from Al, Zr, Li, Mg, Ca, and La and the Li element, which forms a more stable metal oxide than Si, on the interface between the particles containing silicon as a main component (hereafter referred to as silicon particles) and the electrolyte solution, that is, on the silicon particles, it is possible to suppress the formation of silicon oxide, to suppress the deposition of the metal lithium on the silicon particles and the formation of inert LiF, $Li_2O$, $Li_2CO_3$, or the like due to the reaction between the electrolyte solution and the lithium during a charge, and to produce an electrode having long charge-discharge cycle life. It is conceivable that by coating the silicon particles with the lithium composite metal oxide, which is thermodynamically more stable than silicon oxide, the oxidation of the silicon particles is suppressed, lithium is deposited on the solid-solid interface between the lithium composite oxide and silicon particles due to the lithium-ion conductivity of the lithium composite oxide coating during a charge, and the reaction between the electrolyte solution components and lithium is suppressed. A specific method includes immersing silicon particles in an alcohol solution of a nitrate or organic acid salt of metals selected from Al, Zr, Mg, Ca, and La, or an alkoxide, drying the silicon particles, and then firing the silicon particles at 200 to 1000° C. to form a lithium composite metal oxide coating on the silicon particles. A preferred method for further suppressing the formation of silicon oxide during milling of silicon includes wet-milling silicon using alumina or zirconia beads in the alcohol solution to form silicon nanoparticles and, at the same time, form a lithium composite oxide coating thereon. Another preferred method includes mixing $Li_2O$ or LiOH and an oxide or hydroxide of metals selected from Al, Zr, Mg, Ca, and La with silicon particles, dry-milling the silicon particles using a device, such as a planetary ball mill, vibrating mill, or attritor, and then firing the milled particles at 200 to 1000° C. to form a lithium composite oxide coating on the silicon nanoparticles.

(2) Expanded graphite is flaked off by wet-milling or dry-milling it and then used as a conductive additive; or the flaked graphite is mixed with silicon particles and dried to form composite powder of a graphite piece having a high ratio of the surface-direction size to the thickness-direction size flaked off from the expanded graphite (hereafter referred to as "flake graphite") and the silicon particles. Then, the composite powder was mixed with a binder to form an electrode layer on the current collector and then the electrode layer was pressed. Thus, the inventor found that it is possible to dispose the flake graphite in parallel with the current collector surface and to form a long-life electrode having high conductivity and capable of maintaining pores formed due to the expansion of the volume and suppressing stress during lithiation. A preferred method for producing a graphite piece (flake graphite) having a high surface-direction to thickness-direction size ratio includes immersing expanded graphite in a solution of a salt selected from ammonium carbonate, ammonium hydrogencarbonate, and tetraalkylammonium hydroxide and then adding an organic acid to flake off the expanded graphite. The inventor found that the expanded graphite can be easily flaked off due to the expansion of gas that occurs when ammonium carbonate, ammonium hydrogencarbonate, or tetraalkylammonium hydroxide intercalated between the layers of the expanded graphite reacts with the organic acid. The reaction raw materials are gasified by treating them at high temperature and therefore do not remain in the flaked-off expanded graphite.

(3) The inventor found that by complexing an electrode layer including at least silicon particles, a conductive additive, and a binder by mixing one or more fibers selected from cellulose nanofiber, chitin nanofiber, chitosan nanofiber, and milled carbon fiber serving as reinforcing materials into the binder, it is possible to obtain mechanical strength with which the electrode can endure stress that occurs when the volume is expanded or contracted during a lithium insertion/extraction reaction. The inventor also found: the binder is preferably a water-soluble polymer; by using water containing nanometer-sized (100 to 300 nm) bubbles (nano-bubble water) as a solvent for kneading the binder, silicon particles, conductive additive, and fiber, it is possible to form a porous electrode layer, to facilitate the penetration of the electrolyte solution, to increase ion conductivity, and to suppress the expansion of the electrode layer during lithiation.

(4) The inventor found that the charge-discharge cycle life can be extended by using, as the current collector of an electrode including silicon particles, a metal foil including a surface layer containing milled carbon fiber and a binder, or a metal foil having a cross-section in the form of a wave which is selected from a sine wave, a triangular wave, a rectangular wave, a trapezoidal wave, and a saw-tooth wave and in which peaks and valleys are formed in line.

(5) The inventor found that the suppression of an increase in the internal resistance of the battery associated with the charge-discharge cycle and the extension of the charge-discharge cycle life are achieved by using, as the electrolyte solution of a lithium-ion battery using an electrode including silicon particles as an anode, an electrolyte solution containing, as additives, at least at least one or more vinyl monomers selected from the group consisting of styrene, 1-vinyl naphthalene, 2-vinyl naphthalene, acrylonitrile, N-vinyl pyrrolidone, and 4-vinyl pyrrolidone, 2-(2-propynyloxy)-3-vinylnaphthalene and at least one or more divinyl monomers selected from the group consisting of N,N'-methylene bisacrylamide, ethylene glycol dimethacrylate, 1,2-divinylbenzene, and 1,3-divinylbenzene, 1,4-divinylbenzene, and/or one or more salts selected from an aluminum salt and a magnesium salt. The inventor also found that with respect to a monomer having an aromatic ring, of the monomers, a polymer that conducts lithium ions in a reduction reaction is formed on the active material surface; with respect to a divinyl monomer, a stable crosslinking polymer is formed; and if the aluminum salt or magnesium salt is added, a layer of an aluminum- or magnesium-containing oxide or fluoride is formed on the active material. The inventor also found that the charge-discharge cycle life of the energy storage device is extended by using the electrolyte solution containing those additives.

The inventor also found that the suppression of the decomposition of the organic solvent in the electrolyte solution in a side reaction during a charge/discharge, a reduction in flammability, and an improvement in safety are achieved by dispersing lithium-ion solid electrolyte nanoparticles in an electrolyte solution.

A first aspect of the present invention for solving the above problems provides an anode active material (anode material) for energy storage devices capable of storing and releasing lithium ions. The anode active material includes secondary particles that are aggregates of 10 to 300 nm primary particles containing silicon as a main component. The primary particles each include, as a surface layer, a composite metal oxide layer containing at least one or more metal elements selected from at least Al, Zr, Mg, Ca, and La and Li.

A second aspect of the present invention for solving the above problems provides a method for producing an anode active material for energy storage devices capable of electrochemically storing and releasing lithium ions. The method includes a step of immersing silicon particles in an alcohol solution obtained by dissolving a nitrate or organic acid salt of one or more metal elements selected from at least Al, Zr, Mg, Ca, and La and Li and then heat-treating the silicon particles. A preferred method includes milling silicon in the alcohol solution of the nitrate or organic acid salt using a bead mill, drying the milled silicon, and then heat-treating the resulting silicon to give an anode active material. One or more compounds selected from ethylene glycol, propylene glycol, polyethylene glycol, polypropylene glycol, and polyvinyl pyrrolidone may be added to the alcohol solution. Preferably, the production method includes a step of mixing an oxide or hydroxide of one or more metal elements selected from at least Al, Zr, Mg, Ca, and La and lithium hydroxide or lithium oxide with silicon and dry-milling the mixture using a media mill.

A third aspect of the present invention for solving the above problems provides an electrode structure for energy storage devices capable of inserting and extracting lithium ions. The electrode structure includes the active material containing silicon as a main component of the present invention, a conductive additive, a binder, and a current collector. The conductive additive is flake graphite which is obtained by milling or flaking off expanded graphite and in which multiple graphene sheets are stacked, and a plane in which six carbon atoms of the flake graphite have a regular hexagonal structure is oriented in parallel with a wide surface of the current collector.

The binder is a water-soluble polymer and is a composite of one or more fibers selected from a cellulose nanofiber, a chitin nanofiber, a chitosan nanofiber, and milled carbon fiber. The current collector of the electrode structure of the present invention is a metal foil having a cross-section in the shape of a wave which is selected from a sine wave, a triangular wave, a rectangular wave, a trapezoidal wave, and a saw-tooth wave and in which peaks and valleys are formed in line, or a metal foil having a layer made of milled carbon fiber and a binder formed thereon.

A fourth aspect of the present invention for solving the above problems provides an energy storage device that includes at least an anode, a lithium-ion conductor, and a cathode formed of a lithium-transition metal compound and that can store and release lithium ions. The energy storage device uses the electrode structure of the present invention as an anode. The lithium-ion conductor is obtained by dispersing inorganic solid lithium-ion conductor particles in an electrolyte solution obtained by dissolving a lithium salt in an organic solvent. The lithium-ion conductor may be obtained by adding at least an aluminum salt or a magnesium salt to an electrolyte solution obtained by dissolving a lithium salt in an organic solvent. Preferably, the lithium-ion conductor is obtained by adding, to an electrolyte solution obtained by dissolving a lithium salt in an organic solvent, at least one or more vinyl monomers selected from the group consisting of styrene, 1-vinyl naphthalene, 2-vinyl naphthalene, acrylonitrile, N-vinyl pyrrolidone, 4-vinyl pyrrolidone, and 2-(2-Propynyloxy)-3-vinylnaphthalene and at least one or more divinyl monomers selected from the group consisting of N,N'-methylene bisacrylamide, ethylene glycol dimethacrylate, 1,2-divinylbenzene, 1,3-divinylbenzene, and 1,4-divinylbenzene.

The cathode of the energy storage device of the present invention includes lithium-transition metal compound particles coated with a composite oxide containing one or more metal elements selected from at least Al, Zr, Mg, Ca, and La and Li. Preferably, the flake graphite is used as a conductive additive included in the cathode.

Advantageous Effects of Invention

The anode active material capable of storing and releasing lithium ions of the present invention suppresses the formation of an SEI layer during lithiation, has high initial lithium insertion/extraction efficiency, and can store and release a large amount of lithium ions.

The anode active material (anode material) of the present invention and the electrode structure including the conductive additive and binder reinforcing material of the present invention can endure the repetition of the expansion/contraction associated with the electrochemical insertion/extraction of lithium and extend the life. The energy storage device using the electrochemical oxidation-reduction reaction of lithium ions of the present invention can achieve high initial charge/discharge efficiency, high output density, and high energy density and can extend the charge-discharge cycle life. Also, an energy storage device that can be charged quickly can be obtained.

BRIEF DESCRIPTION OF THE DRAWINGS

FIG. 4 is a schematic cross-sectional configuration diagram of a power storage device of the present invention.

DETAILED DESCRIPTION

Figure 1A:
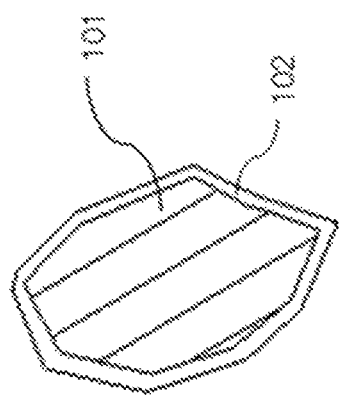
FIG. 1A and 1B are schematic cross-sectional configuration diagram of anode active material particles for storage power devices containing silicon as a main component of the present invention.

Now, the present invention will be described in detail.

An anode active material (anode material) for energy storage devices capable of electrochemically storing and releasing lithium ions of the present invention includes secondary particles that are the aggregates of 10-300 nm primary particles containing silicon as a main component, and the primary particles each include, as a surface layer, a composite metal oxide layer containing at least one or more metal elements selected from at least Al, Zr, Mg, Ca, and La and Li. In order to achieve a high-energy-density rechargeable battery, the silicon content of the anode active material containing silicon as a main component is preferably in a range of 50% to 99% by weight. The production method of the anode active material includes a step of immersing silicon particles in an alcohol solution obtained by dissolving a nitrate or organic acid salt of one or more metal elements selected from at least Al, Zr, Mg, Ca, and La and Li and then heat-treating the silicon particles. The production method may include a step of bead-milling silicon in an alcohol solution of the nitrate or organic acid salt or an alkoxide, drying the milled silicon, and then heat-treating the dried silicon to give an anode active material. One or more compounds selected from ethylene glycol, propylene glycol, polyethylene glycol, polypropylene glycol, and polyvinyl pyrrolidone may be added to the alcohol solution. These compounds have the effect of facilitating the formation of a composite oxide by coordinating with the metal elements. Preferably, the production method includes a step of mixing an oxide or hydroxide of one or more metal materials selected from at least Al, Zr, Mg, Ca, and La, lithium oxide or lithium hydroxide, and silicon powder and dry-milling the mixture using a media mill. Another preferred method includes introducing silicon powder serving as a raw material, powder of one or more metals selected from Al, Zr, Mg, Ca, and La or a compound thereof, and lithium compound powder into thermal plasma to form a composite of silicon nanoparticles and lithium composite metal oxide. Preferably, the compound of the metals or the lithium compound is an oxide, hydroxide, organic acid salt, or organic metal.

An electrode structure for energy storage devices capable of inserting and extracting lithium ions of the present invention includes the active material containing silicon as a main component of the present invention, a conductive additive, a binder, and a current collector. The conductive additive is flake graphite which is obtained by milling or flaking off expanded graphite and in which multiple graphene sheets are stacked, and a plane in which six carbon atoms of the flake graphite have a regular hexagonal structure is oriented in parallel with a wide surface of the current collector. The production method of the flake graphite includes a step of immersing expanded graphite in a solution of a salt selected from ammonium carbonate, ammonium hydrogencarbonate, and tetraalkylammonium hydroxide and then adding an organic acid to flake off the expanded graphite. Preferably, the binder is a water-soluble polymer and is a composite of one or more fibers selected from a cellulose nanofiber, a chitin nanofiber, a chitosan nanofiber, and milled carbon fiber. To form many pores in the electrode layer (mainly, the binder) of the electrode structure, water containing nanometer-sized (100 to 300 nm) bubbles is preferably used as a solvent for kneading the active material containing silicon as a main component, conductive additive, and binder. The current collector of the electrode structure of the present invention is a metal foil having a cross-section in the shape of a wave which is selected from a sine wave, a triangular wave, a rectangular wave, a trapezoidal wave, and a saw-tooth wave and in which peaks and valleys are formed in line, or a metal foil having a layer made of milled carbon fiber and a binder formed thereon.

An energy storage device of the present invention is an energy storage device that includes at least an anode, a lithium-ion conductor, and a cathode formed of a lithium-transition metal compound and that can intercalate and deintercalate lithium ions. This energy storage device uses the electrode structure of the present invention as an anode. The lithium-ion conductor is obtained by dispersing inorganic solid lithium-ion conductor particles in an electrolyte solution obtained by dissolving a lithium salt in an organic solvent. The lithium-ion conductor may be obtained by adding at least one or more salts selected from an aluminum salt and a magnesium salt in an electrolyte solution obtained by dissolving a lithium salt in an organic solvent. Preferably, the lithium-ion conductor is obtained by adding, to an electrolyte solution obtained by dissolving a lithium salt in an organic solvent, at least one or more vinyl monomers selected from the group consisting of styrene, 1-vinyl naphthalene, 2-vinyl naphthalene, acrylonitrile, and N-vinyl pyrrolidone, 4-vinyl pyrrolidone, and 2-(2-Propynyloxy)-3-vinylnaphthalene and at least one or more divinyl monomers selected from the group consisting of N,N'-methylene bisacrylamide, ethylene glycol dimethacrylate, 1,2-divinylbenzene, 1,3-divinylbenzene, and 1,4-divinylbenzene. Preferably, the cathode of the energy storage device of the present invention includes lithium-transition metal compound particles coated with a composite metal oxide containing one or more metal elements selected from at least Al, Zr, Mg, Ca, and La and Li.

Now, embodiments of the present invention will be described with reference to FIGS. 1 to 7.

[Anode Active Material Containing Silicon as Main Component]

An embodiment of the anode active material for power storage devices of the present invention that includes a composite oxide layer formed of at least one or more metal elements selected from at least Al, Zr, Mg, Ca, and La and Li and that contains silicon as a main component will be described more specifically with reference to FIG. 1A and 1B.

Figure 1B:
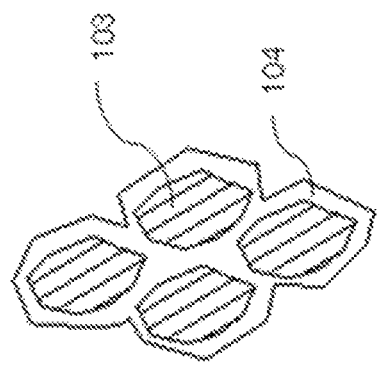

FIG. 1A is a cross-sectional schematic view of an active material particle containing silicon as a main component, and FIG. 1B is a cross-sectional schematic view of a secondary particle that is the aggregate of multiple active material particles containing silicon as a main component. In FIG. 1A and 1B, reference signs 101 and 103 represent active material particles containing silicon as a main component, and reference signs 102 and 104 represent composite metal oxide layers containing at least one or more metal elements selected from at least Al, Zr, Mg, Ca, and La and Li. Ideally, the entire surface of the active material particle containing silicon as a main component is coated with such a composite metal oxide layer, but the entire surface need not necessarily be coated. The material of the active material particle containing silicon as a main component is silicon or silicon alloy. Preferably, the silicon is metal (grade) silicon having a purity on the order of 93 to 99.9% obtained by reducing silicon dioxide, or solar cell-grade silicon or semi-conductor-grade silicon having a higher purity. More preferably, the silicon is metal silicon since metal silicon is cheap and is easily milled due to its small crystal particle size. Metal silicon contains 0.5% by weight or less of iron, 0.5% by weight or less of aluminum, and 0.3% by weight or less of calcium. Preferably, the silicon alloy is an alloy of silicon and at least a transition metal. The diameter of the active material particle containing silicon as a main component and serving as a primary particle is preferably 10 to 300 nm, more preferably 10 to 100 nm. The thickness of the composite metal oxide layer is preferably in a range of 2 to 100 nm, more preferably in a range of 2 to 20 nm. Although not shown in FIG. 1A and 1B, the anode active material particles of the present invention may be entirely or partially coated with an amorphous carbon layer. Also, the composite metal oxide layer may be a composite with amorphous carbon. Preferably, the active material particles have smaller diameters, since the substantial current density on the active material particle surface is reduced during the charge/discharge of the battery; lithium makes oxidation-reduction reactions uniformly; and the volume expands or contracts more uniformly during the insertion/extraction of lithium ions. On the other hand, it is preferred to select a particle size range such that less silicon oxide is formed, since silicon oxide is easily formed in the step for reducing the particle size.

A specific production method of the anode active material of the present invention includes dispersing fine powder consisting of particles containing silicon as a main component in an alcohol solution obtained by dissolving a nitrate or organic acid salt of one or more metal elements selected from at least Al, Zr, Mg, Ca, and La and Li, drying the particles, and then heat-treating the particles in an atmosphere of an inert gas preferably at 200 to 1000° C., more preferably at 300 to 900° C. The production method may include a step of wet-milling powder consisting of particles containing silicon as a main component using a bead mill while using, as a medium, an alcohol solution obtained by dissolving a nitrate or organic acid salt of one or more metal elements selected from at least Al, Zr, Mg, Ca, and La and Li, drying the particles, and then heat-treating the particles in an atmosphere of an inert gas preferably at 200 to 1000° C., more preferably at 300 to 900° C. Preferably, one or more compounds selected from ethylene glycol, propylene glycol, polyethylene glycol, polypropylene glycol, and polyvinyl pyrrolidone is added to the alcohol solution. These compounds facilitate the formation of a composite metal oxide by coordinating with metal ions. Also, part of the compounds is thermally decomposed and thus forms a composite layer with the composite metal oxide as amorphous carbon, remains on the particles containing silicon as a main component, and contributes to an improvement in the conduction of electrons.

[Electrode Structure]

The electrode structure of the present invention is an electrode structure for energy storage devices capable of inserting and extracting lithium ions and includes the active material containing silicon as a main component of the present invention, a conductive additive, a binder, and a current collector. An embodiment of the electrode structure of the present invention will be described more specifically with reference to FIG. 2.

Figure 2:
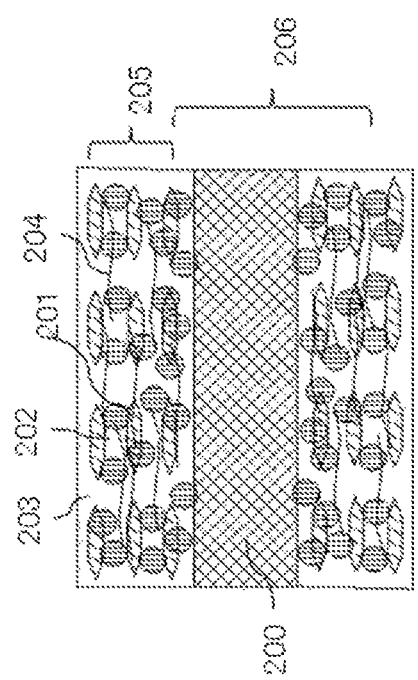
FIG. 2 is a schematic cross-sectional configuration diagram of an electrode structure of the present invention.

FIG. 2 is a cross-sectional schematic view of the electrode structure of the present invention. In FIG. 2, reference sign 200 represents a current collector; reference sign 201 represents an active material containing silicon as a main component; reference sign 202 represents flake graphite as a conductive additive; reference sign 203 represents a binder; reference sign 204 represents a fiber-shaped reinforcing material; reference sign 205 represents a electrode layer; and reference sign 206 represents an electrode structure. Preferably, the conductive additive is flake graphite which is obtained by milling or flaking off expanded graphite and in which multiple graphene sheets are stacked, and a plane in which six carbon atoms of the flake graphite have a regular hexagonal structure is oriented in parallel with a wide surface of the current collector. Carbon black, carbon nanofiber, carbon nanotube, or the like may be further added as a conductive additive. A preferred production method of the flake graphite serving as a conductive additive used in the electrode structure of the present invention includes immersing expanded graphite in a solution of a salt selected from ammonium carbonate, ammonium hydrogencarbonate, and tetraalkylammonium hydroxide and then adding an organic acid to flake off the expanded graphite. As another production method, expanded graphite may be flaked off using a mill that includes a bead mill or ball mill and uses a cavitation effect.

Preferably, the binder 203 is a water-soluble polymer and is mixed with one or more fiber-shaped reinforcing materials 204 selected from a cellulose nanofiber, a chitin nanofiber, a chitosan nanofiber, and milled carbon fiber. The cellulose nanofiber, chitin nanofiber, and chitosan nanofiber are fibers having a diameter of about 4 to 100 nm and a length of 2 μm or more and can be prepared using the aqueous counter collision method or the like. Milled carbon fiber is obtained by milling a carbon fiber thread into short fibers. Preferred milled carbon fiber has a diameter of the order of 7 μm and a length of the order of 30 μm, but not limited thereto. By mixing the fiber-shaped material with the binder, it is possible to improve the mechanical strength, as well as to improve the strength against stress associated with the expansion or contraction of the volume which occurs when the active material containing silicon as a main component stores or releases lithium. If milled carbon fiber is mixed with the binder, it is possible to improve the mechanical strength of the electrode structure, as well as the conductivity thereof. The reason is that milled carbon fiber is less likely to be agglomerated and more likely to be dispersed and has high conductivity compared to a carbon nanofiber or carbon nanotube.

Typical examples of a water-soluble polymer used as the binder include sodium alginate, sodium carboxymethylcellulose, carboxymethylcellulose, sodium polyacrylate, polyacrylic acid, polyvinyl alcohol, chitin, and chitosan. Preferably, the binder is crosslinked in order to increase the mechanical strength. Note that if polyvinyl alcohol, which has high water absorbing properties, is used as a binder for the electrode of an energy storage device as it is, a hydrogen gas occurs during a charge, thereby increasing the pressure in the housing of the energy storage device. To suppress this phenomenon, it is preferred to crosslink polyvinyl alcohol using a crosslinking agent to reduce hydroxyl groups. Polyacrylic acid and polyvinyl alcohol may be mixed so that these components are crosslinked by a hydrogen bond.

Figure 3A:
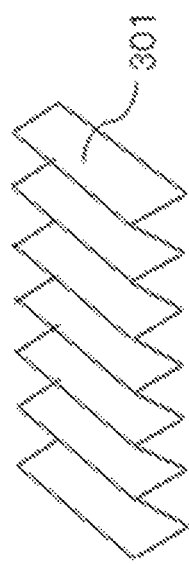
FIG. 3A, 3B and 3C are schematic diagram showing preferred shapes of a current collector included in the electrode structure of the present invention.
Figure 3B:
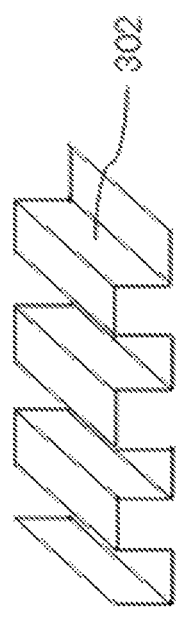
Figure 3C:
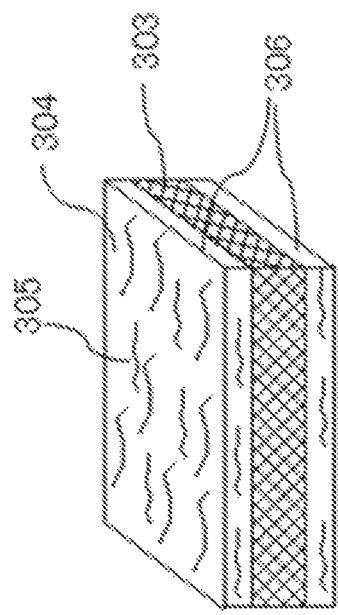

Preferably, the current collector used in the electrode structure of the present invention is a metal foil having a cross-section in the shape of a wave which is selected from a sine wave, a triangular wave, a rectangular wave, a trapezoidal wave, and a saw-tooth wave and in which peaks and valleys are formed in line, or a metal foil having a layer made of milled carbon fiber and a binder formed thereon. FIG. 3A is a schematic diagram showing an example of a current collector having a cross-sectional shape of a triangular wave; FIG. 3B is a schematic diagram showing an example of a current collector having a cross-sectional shape of a rectangular wave; and FIG. 3C is a schematic diagram showing an example of a current collector having thereon a layer formed of milled carbon fiber and a binder. Reference signs 301, 302, and 303 represent metal foils; reference sign 304 represents a binder; reference sign 305 represents milled carbon fiber; and reference sign 306 represents a layer formed of milled carbon and a binder. The metal foil must be formed of a material that is not melted but rather is stable when the energy storage device makes a charge/discharge reaction. Specific examples of the material include copper, stainless steel, titan, and nickel. The above cross-section shape can be easily formed by pressing a metal foil through a roll press having protrusions and recesses patterned thereon. Examples of the material of the binder used in the layer formed of milled carbon fiber and binder include sodium alginate, sodium carboxymethylcellulose, carboxymethylcellulose, sodium polyacrylate, polyacrylic acid, polyvinyl alcohol, chitin, chitosan, polyimide, polyamideimide, polyurethane, and epoxy resin. Preferably, the milled carbon fiber has a diameter on the order of 7 μm and a length on the order of 30 to 150 μm.

If a metal foil having a cross-sectional shape of a wave as described above is used, the current collector of the electrode structure of the present invention can follow the expansion or contraction of the volume caused by the lithiation or delithiation by the anode active material of the present invention containing silicon as a main component when the energy storage device makes a charge/discharge reaction and can reduce stress that occurs due to the expansion or contraction of the volume. Also, if a metal foil having a layer formed of milled carbon fiber and a binder formed thereon are used as the current collector of the electrode structure of the present invention, it is possible to maintain the mechanical strength that can withstand stress that occurs due to the expansion or contraction of the volume when the energy storage device is charged or discharged.

Method for Producing Electrode Structure

A method for producing the electrode structure of the present invention includes the following steps.

First, the active material 201 coated with the composite metal oxide and containing silicon as a main component of the present invention, the flake graphite 202 serving as a conductive additive, the binder 203, and bio-nanofibers (cellulose nanofiber, chitin nanofiber, chitosan nanofiber) serving as fiber-shaped reinforcing materials 204 and/or milled carbon fiber are mixed at a predetermined mixing ratio; a solvent for the binder is added; and the mixture is kneaded using a kneader to prepare a slurry. Then, the resulting slurry is applied to the current collector 200 using a coater, dried, and then heat-treated under a reduced pressure or in an atmosphere of an inert gas to give an electrode structure. The heat treatment temperature is preferably in a range of 100 to 300° C. By using a water-soluble polymer as the binder and water containing nanometer-sizes (100 to 300 nm) bubbles (nano bubble water) as a solvent for the binder, a porous electrode layer can be formed. The gas in the bubbles is preferably a nitrogen gas. If the porous electrode structure of the present invention is used as the anode of an energy storage device that uses reduction/oxidation reactions of lithium ions, it is possible to reduce the expansion of the volume of the active material caused by lithiation during a charge, to facilitate the penetration of the electrolyte solution, and to reduce the internal impedance of the energy storage device.

Preferably, the solid contents of the active material coated with the composite metal oxide and containing silicon as a main component of the present invention, the flake graphite serving as a conductive additive, the binder, and the bio nanofiber and/or milled carbon fiber are 20 to 80% by weight, 10 to 50% by weight, 3 to 20% by weight, and 1 to 5% by weight, respectively, with respect to the entire solid content of the slurry. Preferably, the electrode layer 205 has a thickness of 10 to 50 μm and a density of 0.8 to 2.0 g/cm³.

[Energy Storage Device]

The energy storage device of the present invention is an energy storage device that uses reduction/oxidation reactions of lithium ions and includes at least the electrode structure of the present invention serving as an anode, an ion conductor, and a cathode formed of a lithium-transition metal compound. An embodiment of the electrode structure of the present invention will be described more specifically with reference to FIG. 4.

In FIG. 4, reference sign 401 represents an anode current collector, reference sign 402 represents an anode active material layer, reference sign 403 represents an anode, reference sign 404 represents a lithium-ion conductor, reference sign 405 represents a cathode current collector, reference sign 406 represents a cathode active material layer, reference sign 407 represents a cathode, reference sign 408 represents a housing, reference sign 409 represents an anode lead, reference sign 410 represents an anode terminal, reference sign 411 represents a cathode lead, and reference sign 412 represents a cathode terminal.

The anode 403 is the electrode structure of the present invention. The lithium-ion conductor 404 is preferably obtained by dispersing inorganic solid lithium-ion conductor particles in an electrolyte solution obtained by dissolving a lithium salt in an organic solvent. Examples of the inorganic solid lithium-ion conductor include a sulfur-based amorphous electrolyte represented by $Li_2S-P_2O_5$, sulfur-containing glass, lithium nitride $Li_3N$, a material having a NASICON crystal structure represented by $Li_{1+x+y}Al_x Ti_{2-x}Si_yP_{3-y}O_{12}$ (x=0.3, y=0.2), a material having a garnet structure represented by $Li_7La_3Zr_2O_{12}$, and a germanium-phosphorus-sulfur compound represented by $Li_{10}GeP_2S_{12}$. Preferably, the average diameter of the primary particles of the inorganic solid electrolyte is in a range of 10 to 300 nm. A slurry electrolyte solution obtained by dispersing inorganic solid lithium-ion conductor particles can reduce the organic solvent content, suppress a decomposition reaction acting as a side reaction during a charge, prevent an increase in the SEI layer, suppress an increase in electrode resistance, extend the charge-discharge cycle life, and improve safety. Preferably, an electrolyte solution of the lithium-ion conductor 404, which is obtained by dissolving a lithium salt in an organic solvent, contains at least one or more salts selected from an aluminum salt and a magnesium salt as additives. If an aluminum salt or magnesium salt is added, it is possible to easily form an aluminum- or magnesium-containing oxide coating or fluoride coating on the anode during a cathodic reaction, to increase the resistance of a portion which is more likely to suffer an internal short-circuit and thus to prevent an internal short-circuit, as well as to suppress an electrolyte reaction of the organic solvent contained in the electrolyte solution, to prevent an increase in the SEI layer, to suppress an increase in electrode resistance, and to extend the charge-discharge cycle life. Preferably, the amount of an aluminum salt or magnesium salt added to the electrolyte solution is 0.1 to 3% by weight. Preferably, at least one or more vinyl monomers selected from the group consisting of styrene, 1-vinyl naphthalene, 2-vinyl naphthalene, acrylonitrile, N-vinyl pyrrolidone, 4-vinyl pyrrolidone, and 2-(2-Propynyloxy)-3-vinylnaphthalene and at least one or more divinyl monomers selected from the group consisting of N,N'-methylene bisacrylamide, ethylene glycol dimethacrylate, 1,2-divinylbenzene, 1,3-divinylbenzene, and 1,4-divinylbenzene are added to the electrolyte solution obtained by dissolving a lithium salt in an organic solvent. The vinyl monomers can form a polymer that stably conducts lithium ions onto the anode during a charge reaction, prevent an increase in the thickness of the SEI layer, suppress an increase in electrode resistance, and extend the charge-discharge cycle life.

Preferably, the cathode active material layer 406 of the cathode 407 includes lithium-transition metal compound particles coated with a composite metal oxide containing one or more metal elements selected from at least Al, Zr, Mg, Ca, and La and Li. The composite metal oxide layer containing at least one or more metal elements selected from at least Al, Zr, Mg, Ca, and La and Li can prevent the dissolution of the transition metal element from the lithium-transition metal compound serving as a cathode active material in the electrolyte solution, which acts as a side reaction, during a charge/discharge. Further, the composite metal oxide layer can prevent an increase in the thickness of the SEI layer, suppress an increase in electrode resistance, and extend the charge-discharge cycle life. It is also preferred to reduce the electrical resistance of the cathode by using the above flake graphite as a conductive additive for the cathode.

[Method for Producing Energy Storage Device]

A method for producing the energy storage device will be described with reference to FIG. 4. An energy storage device is assembled as follows: first, the lithium-ion conductor 404 is sandwiched between the anode 403 including the anode current collector 401 and anode active material layer 402 and the cathode 407 including the cathode current collector 405 and cathode active material layer 406 to form a multilayer electrode group; the electrode group is inserted into a battery jar (housing, package) 408 in an atmosphere of dried air or dried inert gas whose dew-point temperature is managed sufficiently; then the electrodes and electrode terminals 410 and 412 are connected through the electrode leads 409 and 411, respectively; and the battery jar 408 is sealed. As used herein, the term "energy storage device" covers capacitors, rechargeable batteries, combinations of a capacitor and a rechargeable battery, or those having a power generation function.

Examples of the specific cell shape of the energy storage device produced in the present invention include flat, cylindrical, rectangular parallelepiped, and sheet shapes. Examples of the cell structure include monolayer type, multilayer type, and spiral type. Among these, a spiral, cylindrical cell, which is obtained by winding the electrode in multiple layers with a separator between the anode and cathode, has a larger electrode area and can pass a large current during a charge/discharge. With respect to rectangular parallelepiped- and sheet-shaped cells, the storage space of a device which store a cell, can be effectively used.

Figure 5:
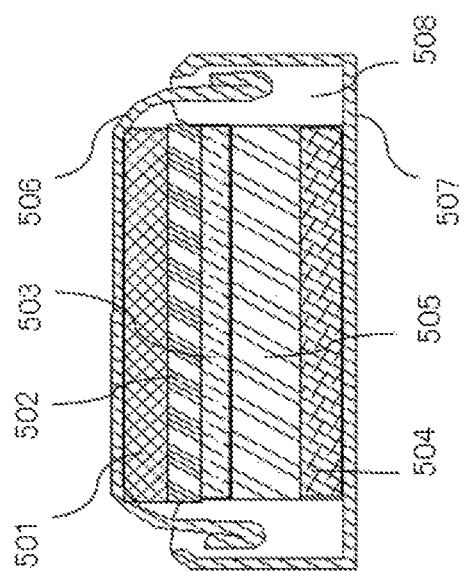
FIG. 5 is a schematic cross-sectional configuration diagram of a coin-type cell, which is an example of the power storage device of the present invention.
Figure 6:
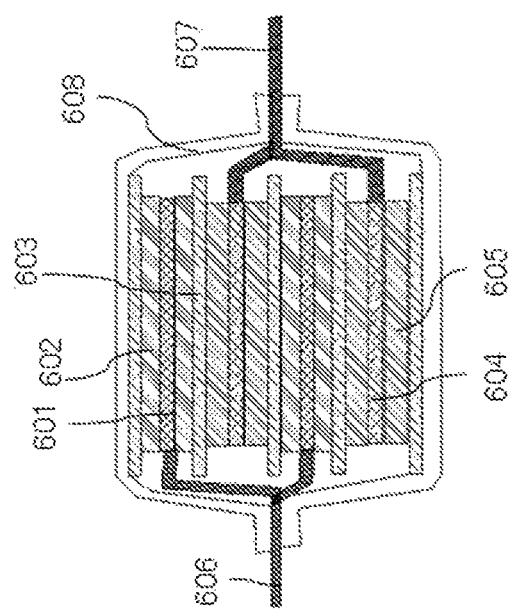
FIG. 6 is a schematic cross-sectional configuration diagram of a laminated cell (pouch cell), which is an example of the power storage device of the present invention.
Figure 7:
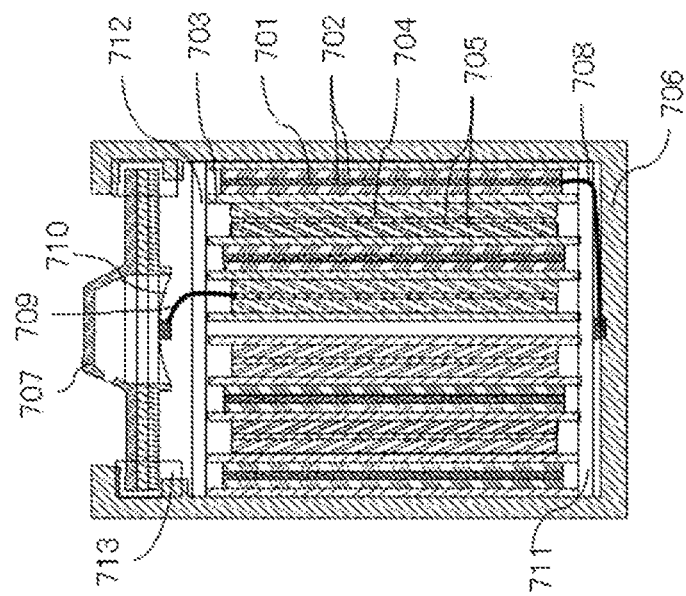
FIG. 7 is a schematic cross-sectional configuration diagram of a cylindrical cell, which is an example of the power storage device of the present invention.

FIG. 5 shows a schematic cross-sectional view of a monolayer flat (coin-type) cell; FIG. 6 shows a schematic cross-sectional view of a laminated cell (pouch cell); and FIG. 7 shows a schematic cross-sectional view of a spiral cylindrical cell. Each cell includes an anode including an anode current collector and an anode active material layer, a cathode including a cathode current collector and a cathode active material layer, and an ion conductor between the anode and cathode. In FIGS. 5, 6, and 7, reference signs 501, 601, and 701 represent anode current collectors; reference signs 502, 602, and 702 represent anode active material layers; reference signs 503, 603, and 703 represent ion conductors; reference signs 504, 604, and 704 represent cathode current collectors; reference signs 505, 605, and 705 represent cathode active material layers; reference sign 708 represents an anode lead; reference sign 709 represents a cathode lead; reference signs 506 and 606 represent anode terminals; reference signs 507, 607, and 707 represent cathode terminals; reference sign 608 represents a battery jar (housing, package); reference signs 508 and 713 represent gaskets; reference sign 710 represents a safety valve; reference signs 711 and 712 represent insulating plates; and reference sign 706 represents a battery jar serving as an anode terminal.

[Cathode]

These cathodes have structures similar to the electrode structure shown in FIG. 2. In each cathode, a cathode active material layer including a lithium-transition metal compound serving as an active material, a binder, and a conductive additive such as carbon black is formed on the cathode current collector.

Examples of a cathode active material for rechargeable batteries using the oxidation and reduction of lithium ions include transition metal oxides, transition metal phosphate compounds, lithium-transition metal oxides, and lithium-transition metal phosphate compounds. Preferably, the cathode active material contains a transition metal element, such as Ni, Co, Mn, Fe, Cr, V, or the like, as a main element. The cathode active material may be mixed with an oxide or composite oxide containing an element selected from Mo, W, Nb, Ta, V, B, Ti, Ce, Al, Ba, Zr, Sr, Th, Mg, Be, La, Ca, and Y as a main component. Preferably, the cathode active material particles included in the cathode are lithium-transition metal compound particles coated with a composite oxide containing one or more metal elements selected from at least Al, Zr, Mg, Ca, and La and Li. Preferably, conductive additives included in the cathode include at least flake graphite which is obtained by milling or flaking off expanded graphite and in which graphene sheets are stacked in multiple layers.

High-specific-surface-area and/or porous carbon is used as a cathode active material for capacitors. Examples of the high-specific-surface-area and/or porous carbon include a carbon material obtained by carbonizing an organic polymer in an atmosphere of an inert gas and a carbon material having pores formed by treating this carbonized material with an alkali or the like. Also, mesoporous carbon obtained by inserting an organic polymer material into a template, such as an oxide, produced in the presence of an amphiphilic surfactant and having oriented pores, carbonizing the material, and eliminating a metal oxide by etching may be used as a cathode active material. Preferably, the specific surface area of the carbon material is 10 to 3000 $m^2$/g. Examples of an conductive additive other than flake graphite include a carbon nanofiber (nanometer-order carbon fiber), a carbon nanotube, graphene, a high-specific-surface-area and/or porous carbon material, such as graphite, having a specific surface area increased by milling or the like, carbon called carbon black, such as acetylene black or Ketjen black, and high-specific surface-area metal oxides, such as manganese oxides (including semimetal oxides).

Examples of the binder include fluororesins such as polyvinylidene fluoride, polyacrylate, polyamic acid (polyimide precursor), polyimide, polyamide-imide, epoxy resins, and styrene butadiene copolymer-carboxymethylcellulose.

Preferably, the material of the current collector is a material that has high electrical conductivity and is inert to a battery reaction. Preferred materials include materials containing one or more metal materials selected from aluminum, nickel, iron, stainless steel, titanium, and platinum. A more preferable material is aluminum, which is cheap and has low electrical resistance. The shape of the current collector is a sheet shape. The "sheet shape" here is not limited to a practical range with respect to the thickness and includes a form called "foil" having a thickness of about 5 to 100 μm. For example, a mesh, spongy, or fiber-shaped member, a punching metal, a metal having a three-dimensional uneven pattern formed on the front and back sides thereof, or an expand metal may be used as long as it has a sheet shape. For example, a plate-shaped or foil-shaped metal having a three-dimensional uneven pattern formed thereon can be produced by transferring a microarray pattern or line-and-space pattern formed on a metallic or ceramic roll to a plate-shaped or foil-shaped metal by applying a pressure to the roll. In particular, an energy storage device using a current collector having a three-dimensional uneven pattern formed thereon has the following advantageous effects: a reduction in the substantial current density with respect to the electrode area during a charge/discharge; an improvement in the adherence to the electrode layer; an improvement in the mechanical strength; an improvement in the rate capability during a charge/discharge; and an improvement in the charge-discharge cycle life.

[Ion Conductor]

If the energy storage device of the present invention is a rechargeable battery, examples of the ion conductor thereof include a separator holding an electrolyte solution (an electrolyte solution prepared by dissolving an electrolyte in a solvent), a solid electrolyte, a solidified electrolyte obtained by gelling an electrolyte solution using a polymer gel or the like, a composite of a polymer gel and a solid electrolyte, and a lithium-ion conductor such as an ionic liquid. In practice, a separator for preventing electrical short-circuit is placed between the anode and cathode, and the micropores of the separator are impregnated with the ion conductor.

The separator is a resin film having a micropore structure or nonwoven fabric structure. Preferably, the resin material is polyolefin such as polyethylene or polypropylene, polyimide, polyamide-imide, or cellulose. To increase heat resistance, the microporous resin film may be coated with a metal oxide particle containing a layer that contains alumina, zirconia, titania, or the like and that passes lithium ions.

The conductivity of the ion conductor used in a rechargeable battery is preferably $1 \times 10^{-3}$ S/cm or more, more preferably $5 \times 10^{-3}$ S/cm or more on a 25° C. basis.

Examples of the electrolyte include salts containing lithium ions ($Li^+$) and Lewis acid ions [$BF_4^-$, $PF_6^-$, $AsF_6^-$, $ClO_4^-$, $CF_3SO_3^-$, $BPh_4^-$ (Ph: phenyl group)], mixed salts thereof and ionic liquid.

Preferably, such a salt is sufficiently dehydrated and deoxidated, for example, by heating it under a reduced pressure. An electrolyte prepared by dissolving the above lithium salt in an ionic liquid may be used. Examples of a solvent for the electrolyte include acetonitrile, benzonitrile, propylene carbonate, ethylene carbonate, dimethyl carbonate, diethyl carbonate, ethylmethyl carbonate, dimethylformamide, tetrahydrofuran, nitrobenzene, dichloroethane, diethoxyethane, 1, 2-dimethoxy-ethane, chlorobenzene, γ-butyrolactone, dioxolane, sulfolane, nitromethane, dimethylsulphide, dimethyl sulfoxide, 3-methyl-2-oxazolidinone, 2-methyl tetrahydrofuran, 3-propylsydnone, sulfur dioxide, and mixed solutions thereof. A solvent having a structure in which hydrogen of the above solvent is substituted by fluorine may be used. Ionic liquid may also be used.

Preferably, the solvent is dehydrated using, for example, active alumina, molecular sieve, phosphorus pentoxide, or calcium chloride. Depending on the solvent, it is preferred to impurity-eliminate and dehydrate the solvent by distilling it in the coexistence of an alkali metal in an inert gas. To achieve high ion conductivity, the electrolyte concentration of an electrolyte solution prepared by dissolving the electrolyte in the solvent is preferably in a range of 0.5 to 3.0 mol/liter.

To suppress the reaction between the electrode and electrolyte solution, it is preferred to add an organic fluorine compound for forming a stable fluoride on the electrode surface, such as fluoro-ethylene carbonate or difluoro-ethylene carbonate.

Preferably, the solidified electrolyte is one obtained by gelling the electrolyte solution using a gelling agent and then solidifying it. Preferably, the gelling agent is a liquid-absorptive, porous material that absorbs the solvent of the electrolyte and thus swells, such as polymer or silica gel. Examples of the polymer include polyethylene oxide, polyacrylonitrile, polymethyl methacrylate, vinylidene fluoride-hexafluoropropylene copolymer, and polyethylene glycol. Preferably, the polymer has a crosslinking structure.

[Gasket]

Examples of the material of the gaskets (508, 713) include a fluororesin, a polyolefin resin, a polyamide resin, a polysulfone resin, and various types of rubber. Examples of the method for sealing the battery include "swaging" using a gasket as shown in FIGS. 5 and 7, as well as glass sealing, an adhesive, and welding.

Examples of the material of the insulating plates (711, 712) in FIG. 7 include various types of organic resin materials and ceramic.

Battery Jar

Examples of the material of the battery jars (housing, package) (408, 608, 706) include stainless steel, an aluminum alloy, a titanium clad stainless material, a copper clad stainless material, and a nickel plating sheet. An aluminum laminate film, which is a laminate of a resin film and an aluminum foil, and the like are also often used.

Other examples of the material of the battery jar include metals other than stainless steel, such as zinc, plastic such as polypropylene, and a composite of a metal or glass fiber and plastic.

[Safety Valve]

A lithium rechargeable battery includes a safety valve (710) as a safety measure for eliminating the pressure when the internal pressure of the battery is increased. The safety valve is, for example, a rapture foil, rubber, spring, or a metal ball.

EXAMPLES

Hereafter, the present invention will be described in more detail with reference to Examples.

[Preparation of Anode Active Material for Energy Storage Devices Containing Silicon as Main Component]

Example M1

One part by weight of lithium citrate and 26.7 parts by weight of aluminum nitrate (9 hydrate) with respect to 100 parts by weight of silicon were added to a solution obtained by dispersing 10% by weight of metal silicon powder having a particle size of 10 μm or less in ethanol. Further, a small amount of polyethylene glycol was added to give a mixed solution. While circulating the resulting mixed solution, the raw-material silicon was milled using a first wet bead mill filled with zirconia beads having a particle size of 0.5 mm until the average particle size became 0.5 μm or less. Then, while circulating the resulting raw material, it was milled using a second wet bead mill filled with zirconia beads having a particle diameter of 0.03 mm until the average particle size became 100 nm or less, to give a milled dispersion slurry.

Then, the resulting milled dispersion slurry was spray-dried using a spray dryer in an atmosphere of a nitrogen gas at 150° C. to give powder. Then, the powder was heat-treated in a firing furnace in an atmosphere of a nitrogen gas at 600° C. for 30 min to give a lithium-aluminum composite oxide-coated silicon composite.

Example M2

One hundred parts by weight of metal silicon powder having a particle size of 100 μm or less, 1.5 parts by weight of lithium hydroxide (1 hydrate), and 9.1 parts by weight of aluminum oxide were mixed using a high-speed planetary ball mill, milled using a vibrating mill for 10 h, and then heat-treated in an atmosphere of nitrogen at 800° C. for 30 min to give a lithium-aluminum composite oxide-coated silicon composite. Typically, when dry-pulverized silicon is extracted in the air, it needs to be gradually oxidized, since red hot occurs due to oxidation. On the other hand, the silicon powder of Example M2 could be extracted safely without having to gradually oxidize it, since the silicon powder was coated with the oxide.

Comparative Example M1

Silicon powder was obtained as in Example M1 except that lithium citrate, aluminum nitrate (9 hydrate), or ethylene glycol was not added.

Comparative Example M2

Silicon was pulverized as in Example 2 except that lithium hydroxide (1 hydrate) or aluminum oxide was not mixed, and then gradually oxidized to give silicon powder.
Analysis of Particles Containing Silicon as Main Component The resulting powder containing silicon as a main component was analyzed using an X-ray photoelectron spectroscopy (XPS), a scanning electron microscope (SEM), a transmission electron microscope (TEM), and an energy dispersive X-ray spectrometer (EDS) and electron energy-loss spectrometer (EELS) accompanying the transmission electron microscope and then evaluated.

In the samples of Examples M1 and M2, the silicon particle surface layer was coated with a composite oxide of lithium and aluminum, and an oxidized coating having a thickness of 2 to 10 nm was identified. In Example M1, carbon was also identified on the surface layer.

In Comparative Example M1, a silicon layer in which hydrocarbon and oxygen were combined was identified on the surface layer; in Comparative Example M2, a silicon oxide layer was identified on the surface layer. The descending order of the amount of silicon oxide is as follows: Comparative Example M2>Comparative Example M1> Example M2>Example M1.
[Preparation of Flake Graphite]

Reference Example G1

A solution was prepared by dissolving ammonium hydrogencarbonate in deionized water, and expanded graphite having an average particle size of 15 μm was dispersed in the solution. With stirring, a solution obtained by dissolving citric acid in deionized water was added to cause the ammonium hydrogencarbonate penetrating the expanded graphite and the citric acid to react with each other to generate carbon dioxide. The expanded graphite was flaked off using the pressure of the generated carbon dioxide to prepare a dispersion of the flake graphite.
[Preparation of Current Collector]

Reference Example C1

An electrolytic copper foil having a thickness of 12 μm was passed between a chrome-plated metal roll having a pitch of 50 μm and a depth of 25 μm and subjected to V-shaped line groove treatment by electronic engraving and a rubber roll, thereby forming a current collector having a cross-sectional shape of a triangular wave (actually, a shape in which peaks and valleys are roundish and which is similar to a sine wave).

Reference Example C2

Deionized water was added and to 95 parts by weight of milled carbon fiber having a diameter of 7 μm and a length of 130 μm and 5 parts by weight of sodium alginate, and kneaded to prepare a slurry. The slurry was applied to both sides of a flat electrolytic copper foil having a thickness of 12 μm and dried at 100° C. to form a current collector.
[Production of Electrode Structure]

Example N1

A binder solution was prepared by dissolving 10% by weight of sodium alginate in an aqueous dispersion of 1% by weight of cellulose nanofiber. Then, the binder solution, 60 parts by weight of the powder containing silicon as a main component of Example M1, 27 parts by weight of the flake graphite prepared in Reference Example G1, and 2 parts by weight of acetylene black were mixed (so that the solid content of sodium alginate became 10 parts by weight and the solid content of the cellulose nanofiber became 1 part by weight). Then, nano bubble water of a nitrogen gas was added and kneaded to prepare a slurry for forming an electrode layer. The resulting slurry was applied to both sides of the copper foil of Reference Example C1 using a coater, then dried at 110° C. for 0.5 h, and further dried under a reduced pressure at 150° C. Then, the thickness and density were adjusted using a roll press to give an electrode structure in which an electrode active material layer having a thickness of 30 μm and a density of 1.2 g/cm$^3$ was formed on a current collector formed of a copper foil. Then, the electrode structure was cut into a predetermined size; then a nickel lead was welded to the tab of the copper foil as a current collector using a spot welder; and a lead terminal was extracted to produce an electrode.

Example N2

An electrode was produced as in Example N1 except that the powder of Example M2 was used in place of the powder of Example M1 containing silicon as a main component.

Example N3

An electrode was produced as in Example N1 except that graphite powder having a particle size of 5 μm was used in place of the flake graphite of Reference Example G1.

Example N4

An electrode was produced as in Example N1 except that a cellulose nanofiber was not mixed.

Example N5

An electrode was produced as in Example N1 except that nano bubble water was not added, but rather deionized water not including nano bubbles was used.

Example N6

An electrode was produced as in Example N1 except that the current collector coated with milled carbon fiber of Reference Example C2 was used in place of the copper foil having a wave-shaped cross-section of Reference Example C1.

Example N7

An electrode was produced as in Example N1 except that a flat electrolytic copper foil current collector having a thickness of 12 μm (not coated with a milled carbon fiber layer) was used in place of the copper foil having a wave-shaped cross-section of Reference Example C1.

Reference Example N1

An electrode was produced as in Example N1 except that the powder of Comparative Example M1 was used in place of the powder of Example M1 containing silicon as a main component.

Reference Example N2

An electrode was produced as in Example N1 except that the powder of Comparative Example M2 was used in place of the powder of Example M1 containing silicon as a main component.

Comparative Example N1

An electrode was produced as in Example N1 except that in Example N3, the powder of Comparative Example M1 was used in place of the powder of Example M1 containing silicon as a main component; no cellulose nanofiber or nano bubble water was used; and a not-to-be-treated flat electrolytic copper foil having a thickness of 12 µm was used in place of the current collector of Comparative Example C1.

[Evaluation of Electrochemical Lithiation Amount of Electrode Structure]

The electrochemical lithiation (lithium insertion) amount of the electrode structure for anode of the energy storage device as a single electrode was evaluated in accordance with the following procedure.

The electrodes of Example N1, Example N2, Reference Example N1, and Reference Example N2 were produced as working electrodes. A cell was produced by combining the metal lithium serving as a counter electrode with the produced electrodes, and the electrochemical lithiation amount was evaluated. The lithium electrode was produced by crimping a metal lithium foil having a thickness of 140 µm to an expand metal formed of a nickel foil and punching the foil into a predetermined size. A pouch cell was used as an evaluation cell. The evaluation cell, which is a pouch cell, was produced in accordance with the following procedure. The pouch cell (laminate type cell) was produced in a dry atmosphere in which water having a dew point of −50° C. or less was managed. An electrode group consisting of working electrode/separator/lithium electrode was inserted into a battery jar obtained by forming an aluminum laminate film having a polyethylene/aluminum foil/nylon structure into a pocket shape; an electrolyte solution was injected; an electrode lead was extracted; and the battery jar was heat-sealed to produce an evaluation cell. A nylon film was formed outside the aluminum laminate film, and a polyethylene film was formed inside the same. Used as the separator was a microporous polyethylene film having a thickness of 17 µm and a porosity of 40%. Used as the electrolyte solution was a solution obtained by dissolving 1M (mol/liter) of lithium hexafluorophosphate ($LiPF_6$) in a solvent obtained by mixing sufficiently dehydrated ethylene carbonate and diethyl carbonate at a volume ratio of 3:7.

The electrochemical lithiation amount was evaluated by discharging the produced cell using the lithium electrode of the cell as an anode and each working electrode as a cathode until the voltage of the cell became 0.01 V and then charging the cell until the voltage became 1.80 V. That is, the amount of discharged electricity was defined as the amount of electricity used to store lithium, and the amount of charged electricity was defined as the amount of electricity used to release lithium.

Charges and discharges were performed at a constant current on the order of 0.2 C, and the coulombic efficiency of the first delithiation amount (the amount of electricity) corresponding to the first lithiation amount (the amount of electricity) and the second delithiation amount (mAh/g) were evaluated. The evaluation results are as follows.

Both the descending orders of coulombic efficiency and delithiation amount of the electrodes were as follows: Example N1>Example N2>Reference Example N1>Reference Example N2. These orders were the same as the ascending order of the silicon oxide content of the active material containing silicon as a main component. The capacities of the electrodes with respect to the weights of the active materials were all 2500 mAh/g or more, and the coulombic efficiencies of the electrodes of Example N1 and Example N2 were 90% or more.

The evaluation results indicate that the active material particles coated with the lithium-containing composite oxide and containing silicon as a main component of the present invention were a material having a lower irreversible capacity in an electrochemical lithium insertion/extraction reaction.

[Production of Cathode]

Reference Example P1

One hundred parts by weight of nickel cobalt manganese lithium oxide powder $LiNi_{1/3}CO_{1/3}Mn_{1/3}O_2$, 2 parts by weight of the flake graphite prepared in Reference Example G1, and 2 parts by weight of acetylene black were mixed. Fifty parts by weight of an N-methyl-2-pyrrolidone solution containing 10% by weight of polyvinylidene fluoride and 50 parts by weight of N-methyl-2-pyrrolidone were added and kneaded to prepare a slurry for forming an electrode active material layer. Then, the resulting slurry was applied onto an aluminum foil having a thickness of 14 µm using a coater, then dried at 110° C. for 1 h, and further dried under a reduced pressure at 150° C. Then, the thickness was adjusted using a roll press to give an electrode structure in which an electrode active material layer having a thickness of 82 µm and a density of 3.2 g/cm$^3$ is formed on a current collector formed of a copper foil. The resulting electrode structure was punched into a predetermined size, and a nickel lead was welded to the tab of the aluminum current collector by ultrasonic welding to produce a cathode electrode.

Reference Example P2

Lithium nitrate and nickel nitrate were mixed at a molar ratio of 1:5 and dissolved in ethanol. To the resulting ethanol solution was added a small amount of polyethylene glycol. Nickel cobalt manganese lithium oxide powder $LiNi_{1/3}Co_{1/3}Mn_{1/3}O_2$ was dispersed in the ethanol solution. The dispersion solvent was passed through micropores formed by a pressuring diamond disc using an extreme pressure pump. The nickel cobalt manganese lithium oxide particles were crushed using the high local impact of cavitation which occurred during the passage, dried at 100° C. using a spray dryer, and heat-treated at 600° C. to give nickel cobalt manganese lithium oxide particles coated with a lithium-aluminum composite oxide layer. Then, an electrode serving as a cathode was produced in a manner similar to Reference Example P1 above.

[reparation of Electrolyte Solution]

Reference Example E1

An electrolyte solution was prepared by dissolving 1M (mol/liter) of lithium hexafluorophosphate ($LiPF_6$) in a solvent obtained by mixing sufficiently dehydrated ethylene carbonate and diethyl carbonate at a volume ratio of 3:7.

Reference Example E2

An electrolyte solution was prepared by adding 2% by weight of 2-vinylnaphthalene and 1% by weight ethylene glycol dimethacrylate to the electrolyte solution of Reference Example E1.

Reference Example E3

An electrolyte solution was prepared by adding 0.05% by weight of lithium nitrate and 1.5% by weight of aluminum iodide to the electrolyte solution of Reference Example E1.

Reference Example E4

An electrolyte solution was prepared by dispersing 25% by weight of a solid electrolyte $Li_{1.5}A_{10.3}Ti_{1.7}Si_{0.2}P_{2.8}O_{12}$ which was pulverized into an average particle size of 100 nm or less and had a NASICON crystal structure, in the electrolyte solution of Reference Example E1.

[roduction of Energy Storage Device]

Example B1

A pouch cell (laminate type) lithium-ion rechargeable battery having a structure in which an anode having anode layers disposed on both sides of an anode current collector is sandwiched between separator films and cathodes each having a cathode layer disposed on one side of a cathode current collector (cathode/separator/anode/separator/cathode) was produced as an energy storage device. The use of the electrode having the electrode layers disposed on both sides of the anode current collector is intended to allow both sides of the current collector to approximately equally receive stress which occurs due to the expansion of the volume during lithiation.

The pouch cell was produced using Example N1 as an anode and Reference Example P1 as a cathode. Also, the pouch cell was produced in a dry atmosphere in which water having a dew point of −50° C. or less was managed. An electrode group consisting of cathode/separator/anode/separator/cathode was inserted into a battery jar obtained by forming an aluminum laminate film having a polyethylene/aluminum foil/nylon structure into a pocket shape; the electrolyte solution of Reference Example E1 was injected; an electrode lead was extracted; and the battery jar was heat-sealed to produce a cell for evaluating cathode capacity regulation. A nylon film was formed outside the aluminum laminate film, and a polyethylene film was formed inside the same. Microporous polyethylene films having a thickness of 17 μm and a porosity of 40% were used as the separators.

Example B2

A rechargeable battery was produced as in Example B1 except that the electrode of Example N2 was used as an anode in place of the electrode of Example N1.

Example B3

A rechargeable battery was produced as in Example B1 except that an electrode of N3 using graphite powder having a particle size of 5 μm in place of flake graphite serving as a conductive additive was used as an anode in place of the electrode of Example N1.

Example B4

A rechargeable battery was produced as in Example B1 except that an electrode of Example N4 produced without mixing a cellulose nanofiber was used as an anode in place of the electrode of Example N1.

Example B5

A rechargeable battery was produced as in Example B1 except that an electrode of Example N5 produced without adding nano bubble water was used as an anode in place of the electrode of Example N1.

Example B6

A rechargeable battery was produced as in Example B1 except that the electrode of Example N6 using the current collector coated with the milled carbon fiber was used as an anode in place of the electrode of Example N1.

Example B7

A rechargeable battery was produced as in Example B1 except that the electrode of Example N7 using the flat electrolytic copper foil having a thickness of 12 μm as a current collector was used as an anode in place of the electrode of Example N1.

Example B8

A rechargeable battery was produced as in Example B1 except that Reference Example E2 containing vinyl monomer as an additive was used as an electrolyte solution; and the electrode of Reference Example P2 was used as a cathode.

Example B9

A rechargeable battery was produced as in Example B1 except that Reference Example E2 containing vinyl monomer as an additive was used as an electrolyte solution.

Example B10

A rechargeable battery was produced as in Example B1 except that Reference Example E3 containing the inorganic additive was used as an electrolyte solution.

Example B11

A rechargeable battery was produced as in Example B1 except that Reference Example E4 having the solid electrolyte dispersed therein was used as an electrolyte solution.

Example B12

A rechargeable battery was produced as in Example B1 except that the electrode of Reference Example P2 was used as a cathode.

Reference Example B1

A rechargeable battery was produced as in Example B1 except that the electrode of Reference Example N1 was used as an anode in place of the electrode of Example N1.

Reference Example B2

A rechargeable battery was produced as in Example B1 except that the electrode of Reference Example N2 was used as an anode in place of the electrode of Example N1.

Comparative Example B1

A rechargeable battery was produced as in Example B1 except that the electrode of Comparative Example N1 was used as an anode in place of the electrode of Example N1.

[Evaluation of Charge/Discharge Test]

The energy storage devices were charged at a constant current density of 1 C, which is a condition in which an SEI layer is more likely to be formed due to the decomposition of the electrolyte solution and the cycle life is more likely to be reduced, until the cell voltage became 4.4 V, then rested for 10 min, then discharged at a constant current density of 1 C until the cell voltage became 2.5 V, and then rested for 10 min. Such charge and discharge were repeated 100 times and then the energy storage devices were evaluated for charge/discharge. As the evaluation results, the descending order of the amount of the 100th charge/discharge was as follows: Example B8>Example B9>Example B10>Example B11>Example B12>Example B1>Example B6>Example B2>Example B4>Example B5>Example B7>Example B3>Reference Example B1>Reference Example B2>Comparative Example B1. The evaluation results indicate that the electrodes of the electrode structures of the present invention and the energy storage devices of the present invention exhibited high performance in terms of both the amount of charge/discharge and charge/discharge repetition characteristics.

INDUSTRIAL APPLICABILITY

As described above, the present invention can provide a high-output-density, high-energy-density, and long-cycle-life energy storage device, an electrode structure for the anode of the energy storage device, and an active material (anode material) used in the electrode structure for the anode.

DESCRIPTION OF REFERENCE SIGNS

101, 103 particle containing silicon as a main component
102, 104 lithium composite metal oxide
200 current collector
201 active material
202 flake graphite
203 binder
204 nanofiber
205 electrode layer
206 electrode structure
301, 302, 303 metal foil
304 binder
305 milled carbon fiber
306 layer containing milled carbon and binder
401, 501, 601, 701 anode current collector
402, 502, 602, 702 anode active material layer
403 anode
404, 503, 603, 703 ion conductor
405, 504, 604, 704 cathode current collector
406, 505, 605, 705 cathode active material layer
407 cathode
408, 608 battery jar (housing, package)
409, 708 anode lead
410, 506, 606, 706 anode terminal
411, 709 cathode lead
412, 507, 607, 707 cathode terminal
508, 713 gasket
710 safety valve
711, 712 insulating plate

The invention claimed is:

1. A method for producing, an anode active material for power storage devices capable of electrochemically inserting and extracting lithium ions, the anode active material having:
   secondary particles, wherein the secondary particles are aggregates of 10-300 nm primary particles containing silicon as a main component, wherein
   the primary particles each include, as a surface layer, a composite metal oxide layer containing at least one or more metal elements selected from at least Al, Zr, Mg, Ca, and La and Li,
   the method comprising:
   forming the surface layer by immersing particles containing the silicon as a main component in an alcohol solution obtained by dissolving a nitrate or organic acid salt of the one or more metal elements selected from at least Al, Zr, Mg, Ca, and La and Li, or an alkoxide and then heat-treating the particles.

* * * * *